Dec. 7, 1965 MASAMICHI YASHIMA 3,221,550
FLOW METER FOR PROPANE OR THE LIKE GAS WITH
A SAFETY DEVICE COMBINED THEREWITH
Filed Jan. 23, 1963

INVENTOR.
MASAMICHI YASHIMA
BY *M. Denn and Town*
ATTORNEYS

United States Patent Office 3,221,550
Patented Dec. 7, 1965

3,221,550
FLOW METER FOR PROPANE OR THE LIKE GAS WITH A SAFETY DEVICE COMBINED THEREWITH
Masamichi Yashima, Shimada-shi, Shizuoka Prefecture, Japan, assignor to Yazaki Meter Co., Ltd., Tokyo, Japan
Filed Jan. 23, 1963, Ser. No. 253,365
Claims priority, application Japan, Apr. 14, 1962, 37/18,275, 37/18,276; July 20, 1962, 37/39,218; Sept. 22, 1962, 37/40,919
3 Claims. (Cl. 73—199)

This invention relates to a flow meter for propane or the like gas with a safety device combined therewith.

It has been the tendency that household kitchen ranges using propane gas have lately been extensively used in many homes. In view of, however, that no suitable meter to indicate the remainder of the gas in a gas cylinder has been available, it has been the case that users had always to worry about the remainder of the gas as the same in the cylinder is decreased. Furthermore, due to the increasing tendency of users of propane gas for household purpose, accidents accompanying the use of the gas have also been increasing.

It, therefore, is an object of this invention to provide a flow meter and a safety device combined therewith in a compact casing in order to enable users to know the remainder of the gas in cylinder from time to time and to prevent any such accidents. Such casing is divided into two chambers by means of a partition having a gas passage and the upper chamber is used for accommodating a flow meter and the lower chamber a safety device. The casing is made of molded plastic resin material and the lower chamber is made thicker in order to enable it to resist high pressure which may be generated in said chamber. Particular consideration has been given to the flow meter according to this invention to react to the slightest flow of low pressure gas.

Furthermore, since the amount of gas contained in the bottles or cylinders usually employed for supplying the gas varies from one cylinder or bottle to the next the amount of gas remaining in each gas cylinder in use is not indicated when the ordinary integrating flow meter is used, although the total amount of gas consumed may be indicated.

It, therefore, is another object of this invention to provide a device to always indicate the remainder of gas in each cylinder regardless of the indication of the flow meter enabling users to know the remainder in a cylinder from time to time.

Figure 1:
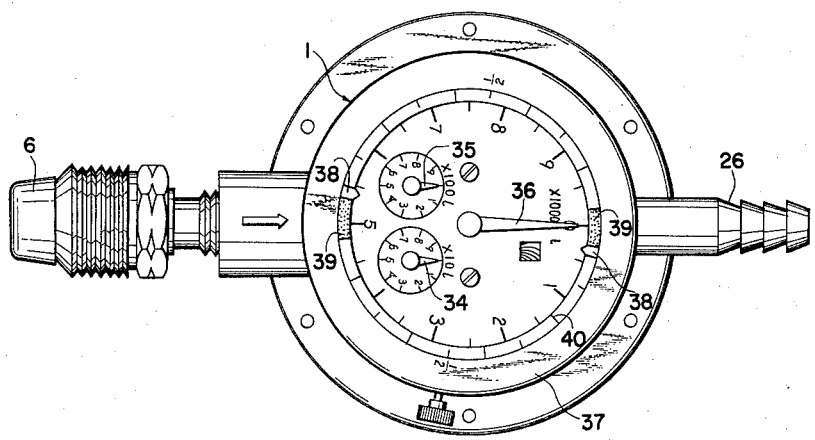
Figure 2:
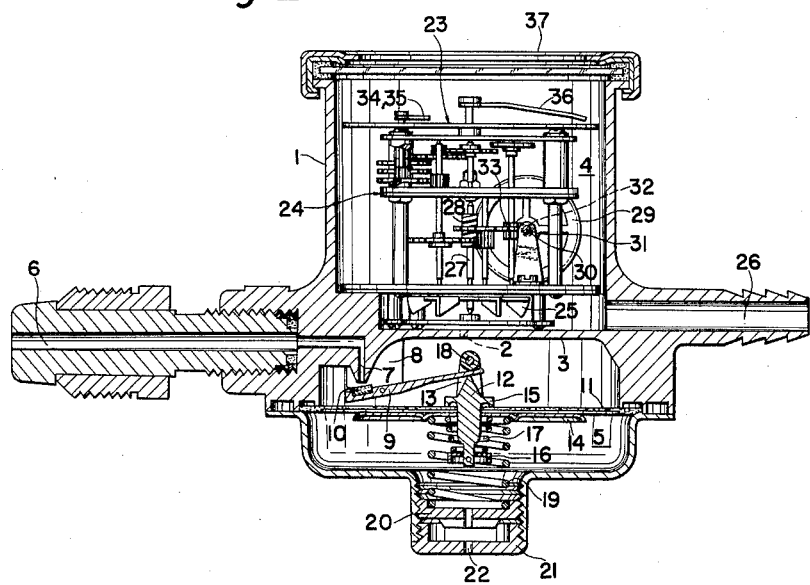

In the attached drawing, wherein an embodiment of this invention is illustrated, FIG. 1 is a plan view of the flow meter according to this invention and FIG. 2 shows a vertical section of the same.

Now explaining my invention in details with reference to the attached drawing, 1 is a cylindrical casing made of molded plastic resin material or the like divided into upper and lower chambers 4 and 5 by means of a partition 3 having a gas passage 2. Said upper and lower chambers 4 and 5 are connected with each other by means of the passage 2. In the upper chamber 4 is accommodated a flow meter, and in the lower chamber 5, a pressure regulating and safety device. As the lower chamber which accommodates the pressure regulating and safety device is subjected to high pressure, it is necessary to construct the wall of said chamber considerably thicker than that of the upper chamber 4.

On one side of the lower chamber 5, is attached a gas inlet 6 which leads to a gas nozzle 7 provided downwardly on the partition 3. A valve 10 provided on one end of a rotary lever 9 pivotally mounted on a pivot provided on a supporting member 8 on the partition 3 is made to face with said gas nozzle 7. The other end of said rotary lever 9 is inserted into a groove 13 of an operating rod 12 attached perpendicularly to a diaphragm 11 at the center thereof. When the pressure of gas within the lower chamber 5 is unusually increased, said diaphragm 11 is made to swell downwardly, thus lowering the operating rod 12 and rotating the rotary lever 9 around the pivot on the supporting member 8 until the valve 10 is made to approach and finally comes to contact with the gas nozzle 7, thus diminishing or completely checking the inflow of gas from the gas passage 6 keeping the pressure of gas within the chamber at a pre-determined level preventing any possible accident due to unusual high pressure which otherwise may be generated in the chamber.

The operating rod 12 pierces through the diaphragm 11 and a supporting plate 14 of said diaphragm 11 at the center thereof. The gap between the diaphragm 11 and the operating rod 12 is sealed by a flange member 15 provided on the operating rod 12 on the nozzle side of the diaphragm. Said flange 15 and the diaphragm 11 are placed in close contact with each other by means of a spring 17 provided between a lock washer 16 fixed at the lower end of the operating rod 12 and the supporting plate 14 of said diaphragm 11. A roller 18 is provided at the upper end of the groove 13 in order to secure smooth operation of said rotary lever 9. 19 is a spring for adjusting the diaphragm provided between the supporting plate 14 and an adjusting screw 20. On the adjusting screw 20 and a cover screw 21, there is respectively provided a ventilating hole 22. A flow meter 23 is fixed in the upper chamber 4 so that blades of an impeller 25 installed at the lower part of a frame 24 may cover the opening of the gas passage 2, through which gas is emitted to rotate the impeller 25. Gas is then led to an outlet pipe 26 provided on the opposite side of the inlet pipe 6. A horizontal axis 30 of a large toothed wheel 29 which engages a worm wheel 28 fixed on a vertical axis 27 of the impeller 25 is supported at its ends by pivot bearings 31. Another worm wheel 32 fixed on the horizontal axis 30 of the large toothed wheel 29 is placed in engagement with a small toothed wheel 33, of which rotative movement is conveyed to pointers 34, 35 and 36 to rotate them through a reduction gear of a group of toothed wheels. Each graduation of the pointer 34 is equivalent to 10 liters, the pointer 35 100 liters and the pointer 36 1,000 liters.

In the construction as described above, as the horizontal axis 30 of the large toothed wheel 29 is supported by the pivot bearings 31 which can minimize the friction torque in conveying the rotative movement of the impeller 25 to the pointers, the impeller 25 can rotate responding to the slightest flow of low pressure gas and accordingly the pointers can indicate any flow of gas sensitively and correctly.

The device for indicating the unused remainder of gas in a cylinder which constitutes a part of this invention incorporated therein is attached to the top of the upper chamber 4 and is consisted of a rotating ring 37 having pointers 38 and 38 projected inwardly and colored markings 39 and 39 on the inner periphery thereof adjacent to said respective pointer 38 and extending in the opposite direction of the travel of the pointer.

The device as illustrated in the attached drawing is for a meter good for two cylinders of 10 kilograms which is equivalent to 5,000 liters, in other words, one full turn of the pointer 36 is good for two 10 kilogram cylinders. Two projected pointers 38 and 38 are provided face to face diametrically on the inner periphery of the ring 37 and markings 39 and 39 in red color are painted adjacent to said pointers 38 and 38 extending in the opposite direction of the travel of said pointer 36 and the periphery of the ring is divided into ten equal sections by means of graduations 40.

In replacing a gas cylinder, said ring 37 is turned to set so that either one of the projected pointers 38 and 38 may lie exactly upon the pointer 36. Thus, by reading the graduations 40 on the ring 37 as pointed by the pointer 36, the amount used and vice-versa the remainder of gas in the cylinder can easily be known. When the pointer 36 comes to point the red marking 39, it means that the cylinder has to be replaced with new one, thus enabling users to know exact time of replacement of gas cylinder.

Thus, the device according to this invention is most useful in knowing the correct amount of gas left in a cylinder from time to time in addition to that the same can prevent any possible accident which may accompany the use of gas in a cylinder for domestic purpose.

While I have illustrated and described the preferred embodiment of the invention, it is to be understood that I do not limit myself to the precise constructions herein disclosed and the right is reserved to all changes and modifications coming within the scope of the invention as set forth in the appended claims.

Having thus described my invention, what I claim is:

1. A gas handling levice particularly for use with gas supplied from a pressurized gas container for example a propane gas container, comprising wall means defining a container having a flow meter chamber and a pressure regulating chamber with a partition wall therebetween having a gas passage defined therein for the flow of gas between said chambers, means defining an outlet passage extending outwardly from the interior of said flow meter chamber, means defining an inlet passage terminating in an opening in said pressure regulating chamber, a resilient member in said pressure regulating chamber supported in a location to be exposed to the pressure of the gas flowing through said inlet passage and being displaceable in accordance with the pressure of the gas, a valve member connected to said resilient member and movable toward and away from the opening of said inlet passage in response to the movement of said resilient member for closing said passage upon increase in gas pressure in said pressure regulating chamber, and flow meter means in said flow meter chamber for measuring and indicating the amount of gas flowing therethrough, said flow meter means comprising a rotatable impeller, said indicator means comprising an indicator dial having indicia thereon, a pointer connected to said impeller and located to overlie said dial and being movable by said impeller to indicate by pointing to the indicia on said dial the quantity of gas which flows through said flow meter chamber, a ring rotatably mounted on said wall means at a location adjacent said indicator dial, said ring having indicia thereon indicating gas quantities arranged around the ring and increasing in a numerical value in a contrary direction to the indication on said indicator dial, said indication on said ring including an index with a colored area defined adjacent said index.

2. A gas handling device particularly for use with gas supplied from a pressurized gas container such as a propane gas container, comprising wall means defining a container having a flow meter chamber and a pressure regulating chamber with a partition wall therebetween having a gas passage defined therein for the flow of gas between said chambers, means defining an outlet passage extending outwardly from the interior of said flow meter chamber, means defining an inlet passage terminating in an opening in said pressure regulating chamber, a resilient member in said pressure regulating chamber supported in a location to be exposed to the pressure of the gas flowing through said inlet passage and being displaceable in accordance with the pressure of the gas, a valve member connected to said resilient member and movable toward and away from the opening of said inlet passage in response to the movement of said resilient member for closing said passage upon increase in gas pressure in said pressure regulating chamber, and flow meter means in said flow meter chamber for measuring and indicating the amount of gas flowing therethrough, said flow meter means including a rotatable impeller arranged above the opening of said partition wall in a position where the flow of gas through said opening causes rotation of said impeller, an indicator dial mounted in said flow meter chamber, an indicator pointer rotatable around said indicator dial, gear means connecting said pointer to said impeller for moving said pointer indicator in proportion to the rotation of said impeller, said indicator dial having graduations thereon and indicating quantities of gas which is flowing through said flow meter chamber in accordance with the displacement of said pointer indicator, a rotatable ring mounted on said wall means to overlie said indicator dial, said ring being rotatable and having graduations thereon increasing around said ring in a direction opposite to the direction of increase of the indications of said dial, said ring being rotatable to position the index of said ring with the index of said dial in an initial position of said pointer indicator whereby said pointer indicator when moved by said impeller simultaneously indicates the quantities of gas flowing through said flow meter chamber on said dial and the quantity of gas remaining in the gas container on said ring member.

3. A gas handling device for connection to a gas container comprising wall means defining a flow meter chamber, inlet and outlet means connected to said chamber for passing gas therethrough, a flow meter in said chamber for measuring the quantity of gas passing through said flow meter chamber including an indicator dial, and a pointer indicator movable around said dial in accordance with the flow of gas through said flow meter chamber, said dial having an index and graduations thereon for indicating the quantity of gas which has passed through said flow meter chamber, and a ring member rotatably mounted adjacent said indicator dial including an index and graduations thereon increasing in an opposite direction from the index in respect to the graduations on said indicator dial for indicating proportions of the total gas in the gas container, said ring member being adapted to have its index positioned adjacent the index of said dial and the initial position of said indicator pointer member before the device is used whereby rotation of said indicator pointer will indicate on said dial the quantity of gas flowing through said flow meter chamber as well as indicate on said ring member the quantity remaining in the gas container.

References Cited by the Examiner

UNITED STATES PATENTS

| | | | |
|---|---|---|---|
| 646,995 | 4/1900 | Johnson | 73—199 |
| 2,129,474 | 9/1938 | Money | 116—129 X |
| 2,425,941 | 8/1947 | Kahn | 116—129 |
| 2,541,174 | 2/1951 | Neustrand | 116—129 |
| 2,784,590 | 3/1957 | Stewart | 73—199 |
| 3,017,938 | 1/1962 | Polich | 177—208 X |

LOUIS R. PRINCE, *Primary Examiner.*

DAVID SCHONBERG, *Examiner.*